United States Patent
Huang et al.

(10) Patent No.: US 8,237,375 B2
(45) Date of Patent: Aug. 7, 2012

(54) ILLUMINATING SYSTEM AND METHOD THEREOF

(75) Inventors: Cheng-Chieh Huang, Taipei (TW); Jinn-Ann Kuo, Sijhih (TW)

(73) Assignee: Capella Microsystems (Taiwan) Ltd., Taipei County (TW)

( * ) Notice: Subject to any disclaimer, the term of this patent is extended or adjusted under 35 U.S.C. 154(b) by 288 days.

(21) Appl. No.: 12/720,699

(22) Filed: Mar. 10, 2010

(65) Prior Publication Data

US 2011/0221349 A1    Sep. 15, 2011

(51) Int. Cl.
*G05F 1/00*    (2006.01)
(52) U.S. Cl. ........ 315/291; 315/307; 315/149; 315/156; 315/169.3; 345/77; 345/81; 345/82
(58) Field of Classification Search ................ 315/169.1, 315/169.3, 149, 156, 224, 291, 307, 312; 356/420, 442, 445, 448; 345/77, 81–83, 345/102
See application file for complete search history.

(56) References Cited

U.S. PATENT DOCUMENTS

| | | | |
|---|---|---|---|
| 6,340,868 B1 * | 1/2002 | Lys et al. | 315/185 S |
| 6,445,365 B1 * | 9/2002 | Taniguchi et al. | 345/9 |
| 6,841,947 B2 * | 1/2005 | Berg-johansen | 315/169.3 |
| 7,639,936 B2 * | 12/2009 | Lin | 396/87 |
| 7,720,554 B2 * | 5/2010 | DiBernardo et al. | 700/56 |

* cited by examiner

*Primary Examiner* — Haiss Philogene
(74) *Attorney, Agent, or Firm* — Harness, Dickey & Pierce, PLC

(57) ABSTRACT

The present invention discloses an illuminating system and a method thereof, comprising a light emitting module, a light sensor and a control module, wherein the control module connects to the light emitting module and the light sensor. The light emitting module emitting light with a first frequency, the light sensor detecting an intensity of incident light, and the control module controls the light emitting module to emit light with a second frequency according to the intensity of incident light.

14 Claims, 4 Drawing Sheets

ILLUMINATING SYSTEM AND METHOD THEREOF

FIELD OF THE INVENTION

The exemplary embodiment(s) of the present invention relates to a field of an illuminating system and a method thereof. More specifically, the exemplary embodiment(s) of the present invention relates to an illuminating system and a method thereof applicable to proximity sensor.

BACKGROUND OF THE INVENTION

The conventional proximity sensor usually comprises a light emitting module, a light sensor and a control module. The light emitting module emits light with a fixed frequency, and the light sensor detects the environment light and the light emitted from the light emitting module then reflected by a subject. When the light emitted from the light emitting module then is reflected by a subject, the light sensor will provide a signal to the control module. In order to make sure the subject does come close to the proximity sensor, the control module will wait for at least two extra signals transferred from the light sensor, and the time interval is 2 times the period (the inverse of frequency). If during this time interval the control module continually receives the signal, then the control module judges the subject does come close to the proximity sensor. However, the responding of this kind of procedure could be up to hundreds of milliseconds, so the sensitivity of the conventional proximity sensor is not good.

There are two ways to solve this problem: one is to increase the frequency of light emitting, the other is to decrease the numbers of signal confirming the subject is surely leaving or closing. However, the former way has higher power consumption, the later causes more false triggers.

SUMMARY OF THE INVENTION

To solve the problems in the conventional arts, it is a primary object of the present invention to provide an illuminating system and a method thereof to solve the problem that the sensitivity of the conventional arts is too low.

To achieve the above object, an illuminating system according to the present invention comprises a light emitting module, a light sensor and a control module. The control module connects to the light emitting module and the light sensor. The light emitting module emits light with a first frequency, the light sensor detects an intensity of incident light, and the control module controls the light emitting module to emit light with a second frequency according to the intensity of incident light.

Wherein the light emitting module comprises a light emitting diode (LED).

Wherein the light emitting module emits invisible light.

Wherein the light sensor provides a plurality of light intensity signals according to the intensity of incident light, and the light intensity signals comprises a first light intensity signal and a second light intensity signal.

Wherein the control module receives the light intensity signals, and then compares the each light intensity signal with a threshold value, when the first light intensity signal is lower than the threshold value and the second light intensity signal is higher than the threshold value, the control module controls the light emitting module to emit light with a second frequency.

Wherein the control module receives the light intensity signals, and then compares the each light intensity signal with a threshold value, when the first light intensity signal is higher than the threshold value and the second light intensity signal is lower than the threshold value, the control module controls the light emitting module to emit light with a second frequency.

To achieve another object, an illuminating method according to the present invention comprises the following steps of: emitting light with a first frequency by the light emitting module; detecting an intensity of incident light by the light sensor; and controlling the light emitting module to emit light with a second frequency according to the intensity of incident light by the control module.

Wherein the light emitting module comprises a light emitting diode (LED).

Wherein the light emitting module emits invisible light.

Wherein the light sensor provides a plurality of light intensity signals according to the intensity of incident light detected by the light sensor, and the light intensity signals comprise a first light intensity signal and a second light intensity signal.

Wherein the control module receives the light intensity signals, and then compares the each light intensity signal with a threshold value, when the first light intensity signal is lower than the threshold value and the second light intensity signal is higher than the threshold value, the control module controls the light emitting module to emit light with a second frequency.

Wherein the control module receives the light intensity signals, and then compares the each light intensity signal with a threshold value, when the first light intensity signal is higher than the threshold value and the second light intensity signal is lower than the threshold value, the control module controls the light emitting module to emit light with a second frequency.

With the above arrangements, the illuminating system and the method thereof according to the present invention has one or more of the following advantages:

(1) The power assumption can be effectively reduced by firing other pulses of LEDs when the intensity of the incident light detected by the light sensor is changed.

(2) The numbers of false triggers can be decreased effectively by firing other pulses of LEDs when the intensity of the incident light detected by the light sensor is changed.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of an illuminating system and a method thereof.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
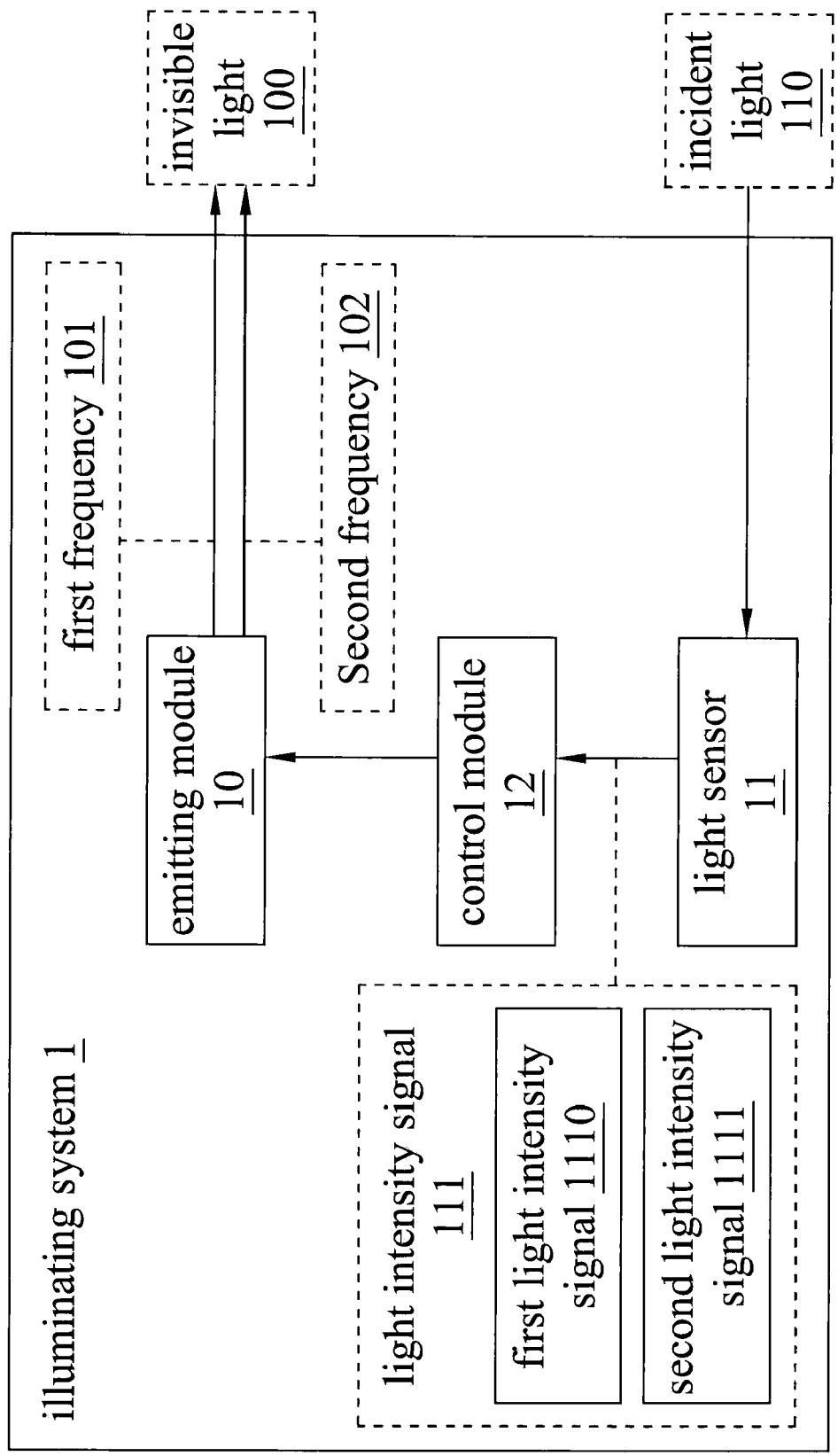
FIG. 1 illustrates a block diagram of an illuminating system in accordance with the present invention.

Please refer to FIG. 1 that illustrate a block diagram of an illuminating system in accordance with the present invention. The illuminating system 1 is applicable to a proximity sensor, comprising a light emitting module 10, a light sensor 11 and a control module 12. The control module 12 connects to the light emitting module 10 and the light sensor 11. The light emitting module 10 emits light 100 with a first frequency 101, the light sensor 11 detects an intensity of incident light 110, and the control module 12 controls the light emitting module 10 to emit light with a second frequency 102 according to the intensity of an incident light 110.

The light emitting module 10 comprises a light emitting diode (LED) and selectively emits invisible light 100 with the first frequency 101 firstly. The light sensor 11 provides a plurality of light intensity signals 110, and the light intensity signals 111 comprise a first light intensity signal 1110 and a second light intensity signal 1111. The control module 12 receives the light intensity signals 111, and then compares the first light intensity signal 1110 and the second light intensity signal 1111 with a threshold value 120, when the first light intensity signal 1110 is lower than the threshold value 120 and the second intensity signal 1111 is higher than the threshold value 120, or the first light intensity signal 1110 is higher than the threshold value 120 and the second light intensity signal 1111 is lower than the threshold value 120, the control module 12 controls the light emitting module 10 to emit the invisible light 100 with a second frequency 102.

Figure 2:
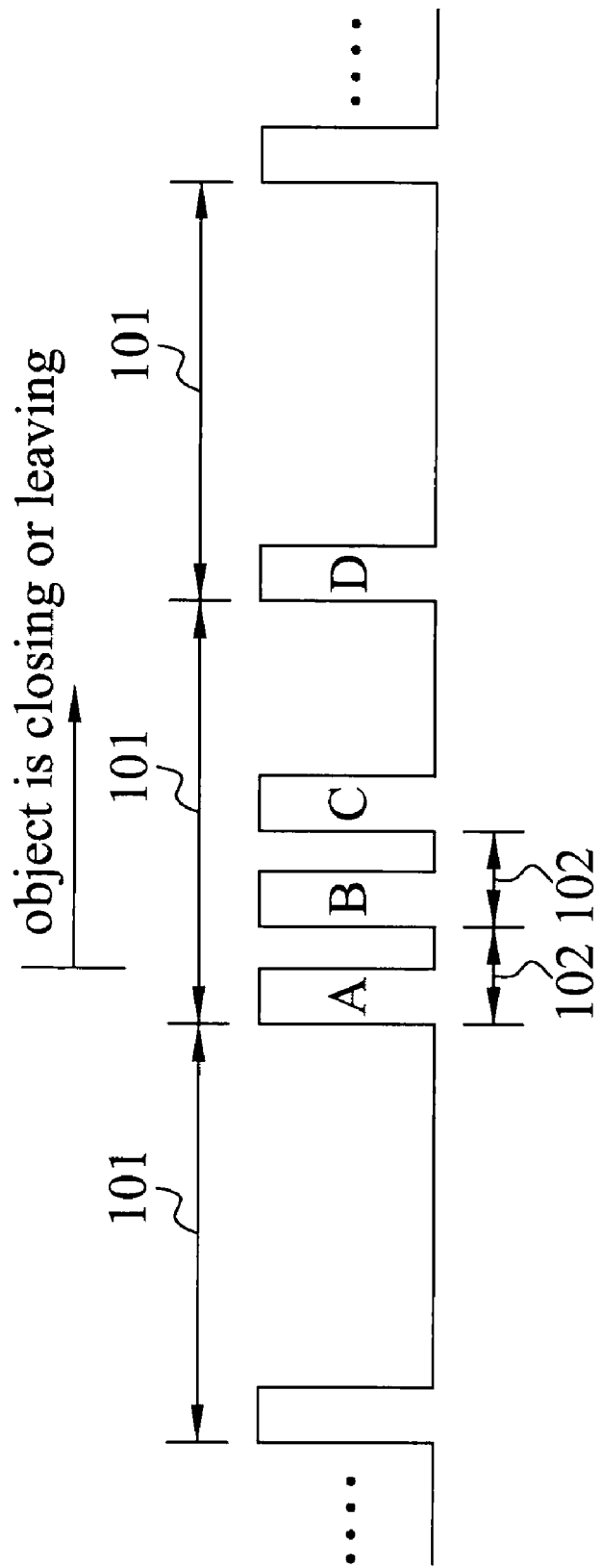
FIG. 2 illustrates a schematic diagram in accordance with first embodiment of the present invention.

Please refer to FIG. 2 that illustrate a schematic diagram in accordance with first embodiment of the present invention. In this embodiment, the light emitting module emits light for 0.2 ms per pulse, and the next pulse will be fired after 63.8 ms, so the first frequency is 15.625 Hz. The control module compares the intensity of an incident light detected by the light sensor with a threshold value (3 for example).

There are two kinds of situations for this embodiment: one is a subject starts to leave the proximity sensor, the other a subject starts to close the proximity sensor.

In the former situation, the light emitted by light emitting module is reflected by the subject closed to the proximity sensor, and then be detected by the light sensor as the incident light. The intensity of the incident light (5 for example) is higher then the threshold value until the subject starts to leave the proximity sensor. When the subject starts to leave the proximity sensor so the intensity of the reflect light of a pulse A (2 for example) is smaller then the threshold value, then the control module commands the light emitting module emitting with a second frequency for two pulses. In this embodiment, the light emitting module emits light for 0.2 ms per pulse, and the next pulse will be fired after 0.6 ms, so the second frequency is 1250 Hz. If the intensities of the light of the extra two pulse reflected by the subject are all smaller then the threshold value, then the control module judges that the subject is leaving the proximity sensor. However, if any one of the intensities of the light of the extra two pulse reflected by the subject is not smaller then the threshold value, the control module considers that is a false trigger.

In the later situation, there isn't any subjects to reflect the light emitted by the light emitting module in the begging, so no light or only background light can be detected by the light sensor, and the intensity of the incident light (0 or 2 for example) detected by the light sensor is smaller than the threshold value until a subject comes close to the proximity sensor. When the subject starts to come close the proximity sensor, the light emitted by the light emitting module, pulse A, will be reflected by the subject. Therefore, the intensity of the reflect light of the pulse A in this situation (5 for example) will be higher then the threshold value, and then the control module commands the light emitting module emitting with a second frequency for two pulses. In this embodiment, the light emitting module emits light for 0.2 ms per pulse, and the next pulse will be fired after 0.6 ms, so the second frequency is 1250 Hz. If the intensities of the light of the extra two pulse reflected by the subject are all bigger then the threshold value, then the control module judges that the subject is coming close the proximity sensor. However, if any one of the intensities of the light of the extra two pulse reflected by the subject is not bigger then the threshold value, the control module considers that is a false trigger.

In the aforementioned situations of the first embodiment, the number of the extra pulses fired and the intervals between any two extra pulses is not limited but can be arbitrary. However, 3 extra pulses with 1250 Hz frequency are preferred. In addition, after the final extra pulse C being fired, the next pulse D will be fired in 62.2 ms (64 ms-1.8 ms). It means that the extra pulses B and C are fired with the second frequency between the two original pulses A and D which are fired with the first frequency.

Figure 3:
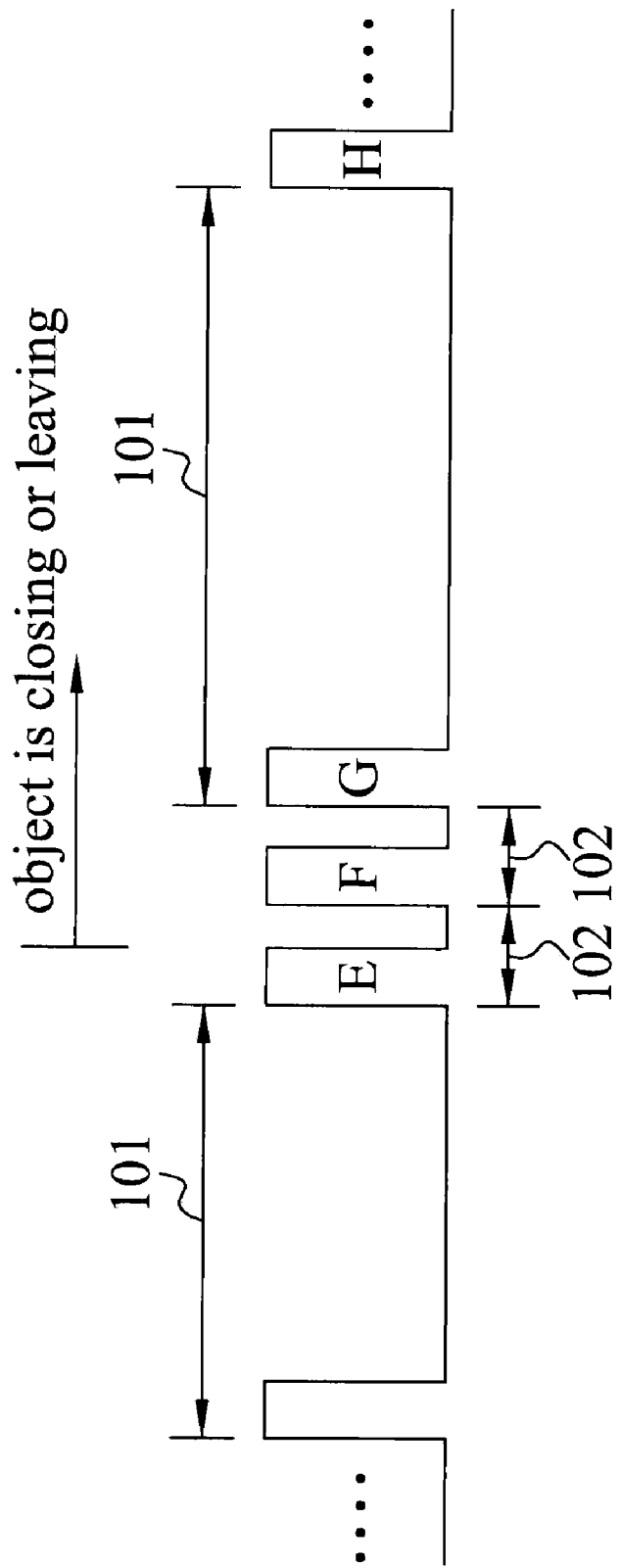
FIG. 3 illustrates a schematic diagram in accordance with second embodiment of the present invention.

Please refer to FIG. 3 that illustrate a schematic diagram in accordance with second embodiment of the present invention. As shown in this figure, the main difference between the first embodiment and the second embodiment is the time to fire the next pulse after the final extra pulse being fired. As mentioned before in the first embodiment, after the final extra pulse C being fired, the next pulse D will be fired in 62.2 ms (64 ms-1.8 ms), means that the extra pulses B,C are fired with the second frequency between the two original pulses A,D which are fired with the first frequency. However, in the second embodiment, the next pulse H after the final extra pulse G being fired will be fired in 64 ms, means that the control module treats the final extra pulse G as another original pulses such like pulse E.

Figure 4:
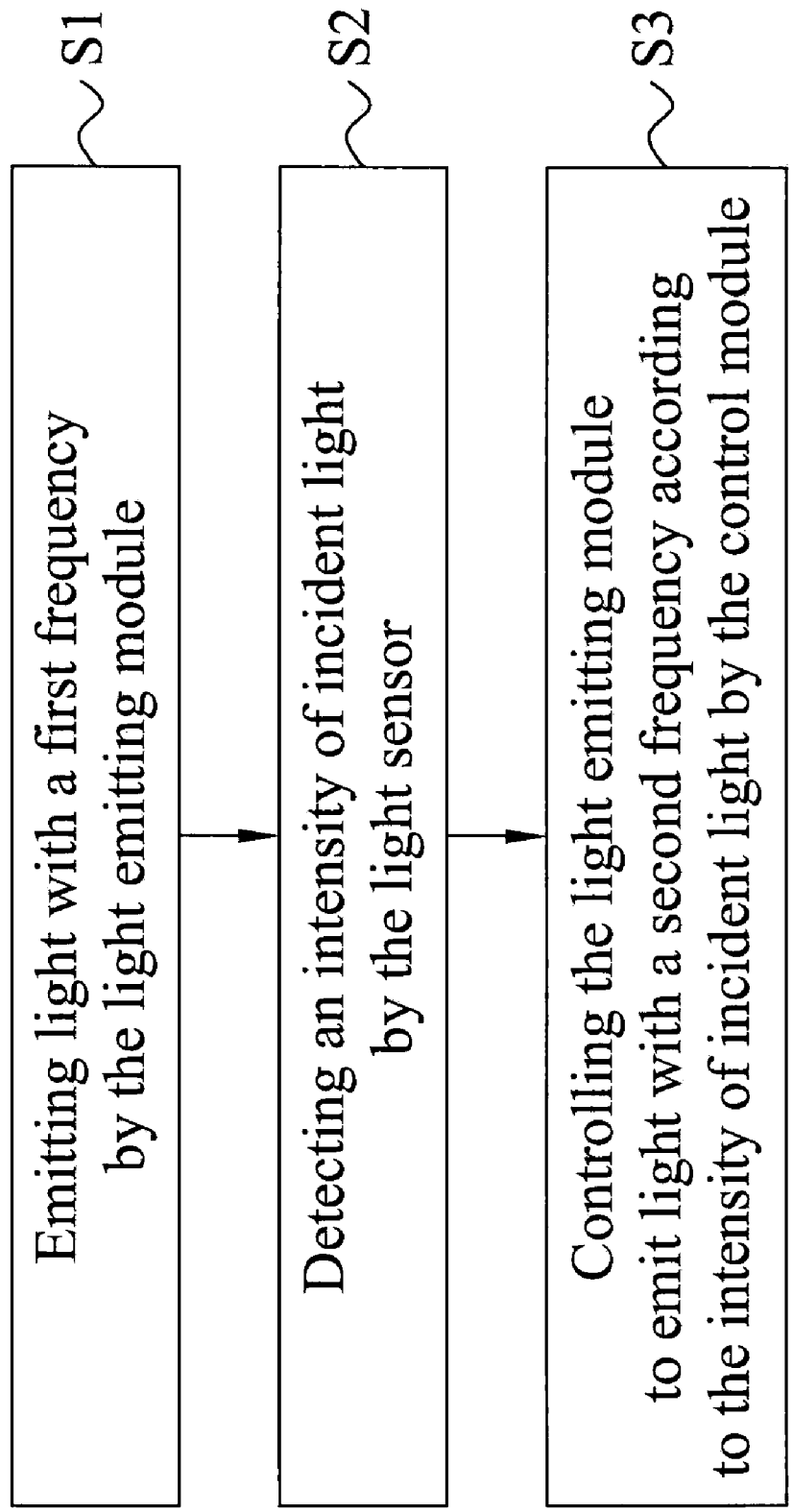
FIG. 4 illustrates a flow chart of an illuminating method in accordance with the present invention.

Please refer to FIG. 4 that illustrates a flow chart of an illuminating method in accordance with the present invention. The method in accordance to the present invention comprises the following steps of:

(S1) emitting light with a first frequency by the light emitting module;

(S2) detecting an intensity of incident light by the light sensor;

(S3) controlling the light emitting module to emit light with a second frequency according to the intensity of incident light by the control module.

The detail description of the method is same as the above-mentioned, and won't be described here again.

The illuminating system and the method thereof in accordance to the present invention are applicable to a proximity sensor, and the proximity sensor can further be integrated in an electronic apparatus, especially a mobile phone having a capacitive touch screen. When the user picks up the phone and moves it close to the ear, due to the high sensitivity of the capacitive touch screen, false triggers are often be executed. By the illuminating system and the method thereof in accordance to the present invention, the probability of executing of false triggers can be effectively decreased and simultaneously save substantial electricity power of the mobile phone.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. An illuminating system, comprising:
    a light emitting module emitting light with a first frequency;
    a light sensor detecting an intensity of incident light; and
    a control module connected to the light emitting module and the light sensor, the control module controlling the light emitting module to emit light with a second frequency according to the intensity of incident light;
    wherein the light sensor provides a plurality of light intensity signals according to the intensity of incident light detected by the light sensor, and the light intensity signals comprise a first light intensity signal and a second light intensity signal;
    wherein the control module receives the light intensity signals and then compares each light intensity signal with a threshold value, when the first light intensity signal is lower than the threshold value and the second light intensity signal is higher than the threshold value, the control module controls the light emitting module to emit light with the second frequency.

2. The illuminating system of claim 1, wherein the light emitting module comprises a light emitting diode (LED).

3. The illuminating system of claim 2, wherein the light emitting module emits invisible.

4. The illuminating system of claim 1, wherein the control module receives the light intensity signals and then compares each light intensity signal with the threshold value, when the first light intensity signal is higher than the threshold value and the second light intensity signal is lower than the threshold value, the control module controls the light emitting module to emit light with the second frequency.

5. An illuminating method applicable to an electric apparatus having a light emitting module, a light sensor and a control module, comprising:
    emitting light with a first frequency by the light emitting module;
    detecting an intensity of incident light by the light sensor; and
    controlling the light emitting module to emit light with a second frequency according to the intensity of incident light by the control module;
    wherein the light sensor provides a plurality of light intensity signals according to the intensity of incident light detected by the light sensor, and the light intensity signals comprise a first light intensity signal and a second light intensity signal;
    wherein the control module receives the light intensity signals and then compares the each light intensity signal with a threshold value, when the first light intensity signal is lower than the threshold value, and the second intensity signal is higher than the threshold value, the control module controls the light emitting module to emit light with the second frequency.

6. The illuminating method of claim 5, wherein the light emitting module comprises a light emitting diode (LED).

7. The illuminating method of claim 6, wherein the light emitting module emits invisible light.

8. The illuminating method of claim 5, wherein the control module receives the light intensity signals and then compares each light intensity signal with the threshold value, when the first light intensity signal is higher than the threshold value and the second light intensity signal is lower than the threshold value, the control module controls the light emitting module to emit light with the second frequency.

9. An illuminating system, comprising:
    a light emitting module emitting light with a first frequency;
    a light sensor detecting an intensity of incident light; and
    a control module connected to the light emitting module and the light sensor, the control module controlling the light emitting module to emit light with a second frequency according to the intensity of incident light;
    wherein the light sensor provides a plurality of light intensity signals according to the intensity of incident light detected by the light sensor, and the light intensity signals comprise a first light intensity signal and a second light intensity signal;
    wherein the control module receives the light intensity signals and then compares each light intensity signal with a threshold value, when the first light intensity signal is higher than the threshold value and the second light intensity signal is lower than the threshold value, the control module controls the light emitting module to emit light with the second frequency.

10. The illuminating system of claim 9, wherein the light emitting module comprises a light emitting diode (LED).

11. The illuminating system of claim 10, wherein the light emitting module emits invisible.

12. An illuminating method applicable to an electric apparatus having a light emitting module, a light sensor and a control module, comprising:
    emitting light with a first frequency by the light emitting module;
    detecting an intensity of incident light by the light sensor; and controlling the light emitting module to emit light with a second frequency according to the intensity of incident light by the control module;

wherein the light sensor provides a plurality of light intensity signals according to the intensity of incident light detected by the light sensor, and the light intensity signals comprise a first light intensity signal and a second light intensity signal;

wherein the control module receives the light intensity signals and then compares each light intensity signal with a threshold value, when the first light intensity signal is higher than the threshold value and the second light intensity signal is lower than the threshold value, the control module controls the light emitting module to emit light with the second frequency.

13. The illuminating method of claim 12, wherein the light emitting module comprises a light emitting diode (LED).

14. The illuminating method of claim 13, wherein the light emitting module emits invisible light.

* * * * *